United States Patent [19]

Adachi et al.

[11] Patent Number: 5,522,352
[45] Date of Patent: Jun. 4, 1996

[54] VALVE TIMING CONTROL SYSTEM FOR ENGINES

[75] Inventors: Michio Adachi, Obu; Yasushi Morii, Nagoya; Masaaki Shinojima, Kariya, all of Japan

[73] Assignee: Nippondenso Co., Ltd., Kariya, Japan

[21] Appl. No.: 383,590

[22] Filed: Feb. 3, 1995

[30] Foreign Application Priority Data

Feb. 4, 1994 [JP] Japan .................................. 6-013008

[51] Int. Cl.⁶ .................................................. F01L 1/34
[52] U.S. Cl. ................................ 123/90.15; 123/90.17
[58] Field of Search .............................. 123/90.15, 90.17, 123/90.31

[56] References Cited

U.S. PATENT DOCUMENTS

| | | | |
|---|---|---|---|
| 4,909,194 | 3/1990 | Bauer | 123/90.15 |
| 5,218,935 | 6/1993 | Quinn, Jr. et al. | 123/90.17 |
| 5,222,465 | 6/1993 | Sakamoto et al. | 123/90.15 |
| 5,289,805 | 3/1994 | Quinn, Jr. et al. | 123/90.15 |

FOREIGN PATENT DOCUMENTS

| | | |
|---|---|---|
| 0445555 | 9/1991 | European Pat. Off. . |
| 63-131808 | 6/1988 | Japan . |
| 2-308909 | 12/1990 | Japan . |
| 22152193 | 7/1985 | United Kingdom . |

*Primary Examiner*—Weilun Lo
*Attorney, Agent, or Firm*—Cushman, Darby & Cushman

[57] ABSTRACT

To realize a highly reliable feedback control of the valve timing, i.e., angular rotational relation between a crankshaft and a camshaft, three reference signals are generated from the crankshaft side, and three cam signals corresponding to three pulse inductors arranged at even angles to the camshaft or arbitrary angle intervals to the camshaft are generated from the camshaft side. The variation in the phase difference of each cam signal to each reference angle signal caused by the installation position of the corresponding pulse inductors is stored in a memory as compensation values indicating differences from the phase difference used as a reference. When the signals are detected, the corresponding compensation value for the phase differences other than those used as reference is read out, added and compensated. Based on the relation of the compensated phase difference and a target value of the valve timing, the rotational phase of the crankshaft and the camshaft is controlled.

10 Claims, 11 Drawing Sheets

VALVE TIMING CONTROL SYSTEM FOR ENGINES

CROSS REFERENCE TO RELATED APPLICATION

This application is based upon and claims priority of Japanese Patent Application No. 6-13008 filed Feb. 4, 1994, the content from which is incorporated herein by reference.

BACKGROUND OF THE INVENTION

1. Field of the Invention

The present invention generally relates to a valve timing control device for internal combustion engine that controls the opening/closing timings of engine intake and exhaust valves according to operating conditions of the engine.

2. Related Art

As is known in the internal combustion engine, the rotation of the crankshaft is conveyed via appropriate conveyance mechanism to the camshaft on which multiple cams are installed to open or close the multiple intake or exhaust valves in the engine. It is also known that the rotation ratio between the crankshaft and the camshaft is normally maintained at 2 to 1 via the conveyance mechanism.

However, the opening/closing timings of the intake and exhaust valves set via the crankshaft, conveyance mechanism and camshaft is set to the optimum timing of the corresponding internal combustion engine, such as for the rated output. However, if the opening/closing timings of these valves are fixed, the timings will slightly deviate during low loads or high loads of the engine, and abnormalities such as backflow of the exhaust gas may occur.

Thus, conventionally a rotational phase adjustment mechanism was placed between the conveyance means and the camshaft to adjust the mutual rotational phase or rotational phase between the crankshaft and the camshaft, and the opening/closing timings of said valves were variably controlled by the adjustment mechanism. For example, in the device described in Japanese Patent Application laid-open No. 2-308909, opening/closing timings of the valves were variably controlled with the following method:

An angle-wise synchronized signals were generated from both the crankshaft and the camshaft, The relative angle of rotation (opening/closing timing of valve, or valve timing) between the crankshaft and the camshaft were detected from the phase difference of these signals, While monitoring this relative angle of rotation, the phase adjustment amount by the rotational phase adjustment mechanism was fed back and controlled so valve opening/closing timings adapted to the operation conditions of the internal combustion engine could be achieved.

The mechanism described in Japanese Patent Application laid-open No. 63-131808 is also known as the rotational phase adjustment mechanism. In this rotational phase adjustment mechanism, an intermediate member to convey the rotation by the engagement of a helical spline between the conveyance mechanism and the camshaft, and the rotational phase (relative angle of rotation) between the conveyance mechanism and the camshaft was varied by sliding this intermediate member from the hydraulic piston in the cam axial direction.

As explained below, the optimum opening/closing timing of the intake valve or exhaust valve changes according to the operation conditions of the internal combustion engine such as rotational speed and throttle opening degree. Thus, the device that controls the valve timing must swiftly respond to the changes in the engine conditions.

On the other hand, for the valve timing to be swiftly controlled by feed back in this manner, the valve timing detection cycle must be shortened, or in other words, multiple valve timings must be detected while the camshaft rotates once. For this, multiple signals that indicate the cam position (camshaft angle of rotation) must be generated while the camshaft rotates once.

However, normally the rotational angular velocity of the camshaft fluctuates because the force applied on the cam profile surface fluctuates due to the opening/closing drive of the valve. Thus, if multiple signals to indicate the cam position while the camshaft rotates once are generated, time-wise variations or inaccuracies will occur in the timing that the signals are generated due to this rotational angular velocity fluctuation. If this time-wise variation occurs in the signals for indicating the cams position, the detection results of the valve timing will fluctuate in synchronization with camshaft rotation.

In the rotational phase adjustment mechanism in which an intermediate member is engaged between the conveyance mechanism and the camshaft, various looseness will occur between the conveyance mechanism, the intermediate member and the camshaft. Thus, even if the adjustment mechanism is in the non-performing state, the intermediate member (engagement position of gears) will move the above looseness amount due to the fluctuation in the camshaft drive torque caused by the changes in the force applied on the cam profile surface. In other words, if the multiple signals for indicating the cam position are outputted, a differing phase difference will be indicated per signal for the reference angle signal generated based on the crankshaft rotation. This will also cause the detection results of the valve timing to fluctuate.

In this manner, if the detection results of the valve timing fluctuate, normally even if the above feedback control system is used, the rotation phase adjustment mechanism is controlled to absorb the fluctuation amount. This causes hunting to occur in the adjustment mechanism, and thus controlling to the target valve timing is difficult. This may also cause the feedback control reliability to be remarkably lost.

In the so-called V-type internal combustion engine, in which each cylinder block is divided into two banks with a V-shape centering on the crankshaft, two camshafts are installed, one for each bank, to operate the intake valves and exhaust valves. Each corresponding valve is sequentially driven via the independent cams installed on the two camshafts. Thus, often, the installation of the cam to the camshaft is itself non-cyclic, and although the fluctuation explained above is synchronized to the camshaft, it is not cyclic to each rotation of the camshaft. Thus, in the V-type internal combustion engine, if multiple signals are output to indicate the cam position, the rotational angular velocity fluctuation and drive torque fluctuation of the camshaft will be more serious.

SUMMARY OF THE INVENTION

In view of the above problem, the present invention has a primary object to provide a valve timing control device for an internal combustion engine in which, no matter what type of internal combustion engine, including a V-type engine, the relative angle of rotation of the crankshaft and camshaft can be swiftly and accurately detected, and highly reliable feedback control can be executed for the valve timing.

According to the present invention, the rotational phase of a camshaft to a crankshaft can be variably set with a rotational phase adjustment means. The relation of the set rotational phase can be feedback controlled with feedback by monitoring the phase difference of a reference angle signal and a cam signal so that the target relation, or optimum valve opening/closing timing that matches the respective operation conditions of the internal combustion engine can be achieved by phase control means.

Here, the at least two signal induction means are provided at arbitrary angle-wise intervals to the camshaft, but the variation that occurs in the camshaft signal relative to the reference angle signal because of the arrangement position of the signal induction means is compensated by software via the phase difference compensation means. In other words, no matter how the cam is laid to the camshaft, and no matter how the camshaft angular velocity or drive torque fluctuates, the same phase difference caused by these fluctuations can be easily and accurately compensated. Thus, in addition to the V-type internal combustion engine, the opening/closing timing of the valves can be controlled to a favorable timing via feedback control for any type of internal combustion engines.

The following can be considered as the phase difference compensation means:

(A) First computation means to compute the compensation value of the phase difference using one of the phase differences of the cam signal and the reference angle signal as the difference value or ratio value, and second computation means to compensate the phase difference of the cam signal and the reference angle signal phase difference other than that used as the reference by adding or multiplying each of the corresponding values of the computed compensation value, or (B) Phase difference compensation means in which compensation value computation means compute the difference amount value under the various operation conditions of the internal combustion engine using the compensation value for phase difference of the cam signal and the references angle signal as reference, a compensation value memory is incorporated in which computed compensation values are registered or stored as maps in correspondence to parameters that indicate the operation conditions of the internal combustion engine, and compensation means reads the corresponding compensation values from the compensation value memory according to each operation condition of the internal combustion engine for phase difference other than the cam signal and the reference angle signal phase difference not used as the reference.

Basically simple and accurate compensation can be realized with the configuration described in (A), but when the configuration in (B) is used, a further precise compensation that matches the operation conditions of the internal combustion engine can be done simply and accurately. The operation conditions of the internal combustion engine used here include the speed of the engine, etc.

In addition to compensating the inconsistency in the phase difference with software, the following can be incorporated for the two signal induction means. For example, Means installed under installation conditions in which the position is deviated only the angle at which the camshaft angular velocity fluctuation can be absorbed at the position from the position corresponding angle-wise to the reference angle signal generated to the camshaft.

By using the above means, the hardware-wise variation in phase difference can also be compensated. The "installation conditions in which the position is deviated only the angle at which the camshaft angular velocity fluctuation can be absorbed at the position from the position corresponding angle-wise to the reference angle signal" here refers to the layout conditions of the signal induction means in which the time difference (phase difference) of the reference angle signal and the cam signal is constantly equal.

Thus, in addition to the V-type internal combustion engine, the opening/closing timing of the valves can be controlled to a favorable timing via feedback control for any type of internal combustion engine.

These at least two signal induction means, particularly for the V-type internal combustion engine, are Installed at uneven intervals under position conditions in which position is deviated only by angle in which the camshaft angular velocity fluctuation can be absorbed at position corresponding angle-wise to the reference angle signal in regard to row of cams having no angle-wise cycle looking from each camshaft axial direction.

When using the signal induction means laid with these conditions, the phase difference compensation means do not necessarily need to be incorporated, but if these phase difference compensation means are used in combination, feedback control with a further high reliability can be realized.

DETAILED DESCRIPTION OF THE PREFERRED EMBODIMENTS

The first embodiment of a valve timing control device for internal combustion engines according to the present invention will now be described.

This embodiment is applied to a V-type 8-cylinder double overhead cam type internal combustion engine in which eight cylinders are divided into two V-shaped banks centering on a crankshaft and two camshafts for intake valve and exhaust valve are installed for the banks. The device controls, in particular, the opening/closing of the intake valve of the internal combustion engine.

Figure 1:
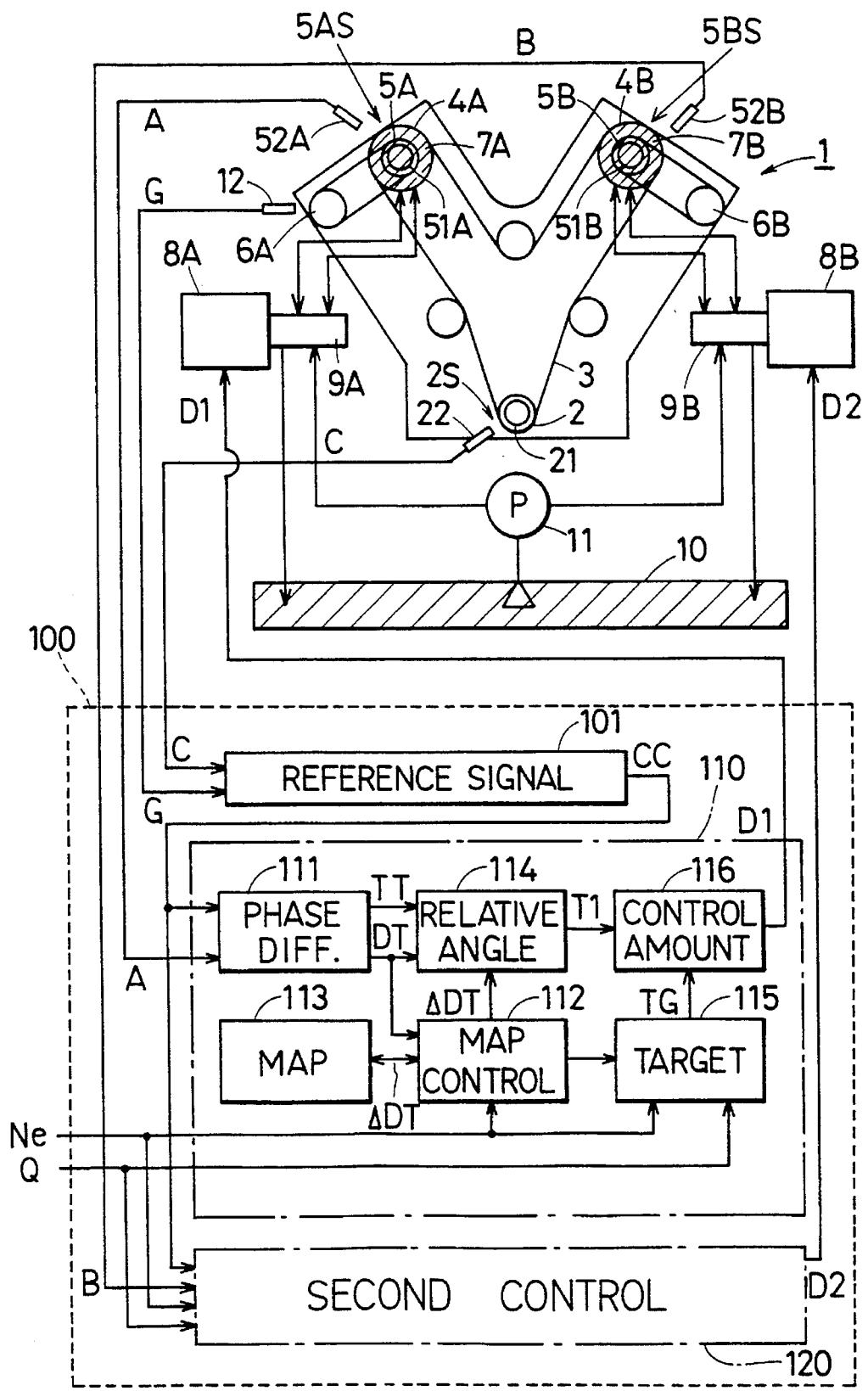
FIG. 1 is a block diagram illustrating the first embodiment of a valve timing control device for an internal combustion engine according to the present invention.

The internal combustion engine 1 of the embodiment illustrated in FIG. 1 is the V-type 8-cylinder double overhead cam type internal combustion engine, and two banks each comprising 4 cylinders shaped into a V are formed centering on a crankshaft 2 of the engine 1.

The rotation of the crankshaft 2 is conveyed to each sprocket 4A and 4B of both banks by a timing chain 3. Camshafts 5A and 5B for the intake valves installed on each bank are rotated and driven via these sprockets 4A and 4B. In other words, this timing chain 3, the sprockets 4A and 4B are a conveyance mechanism for conveying the crankshaft rotation to camshafts 5A and 5B. Camshafts 6A and 6B for the exhaust valves are each rotated and driven separately via the appropriate conveyance means from the camshaft 5A and 5B for the intake valves.

On the other hand, rotation phase adjustment mechanisms 7A and 7B are installed between the sprocket 4A and the camshaft 5A for intake valves on the first bank and between the sprocket 4B and the camshaft 5B for intake valves on the second bank. These rotation phase adjustment mechanisms 7A and 7B are used to adjust the relative rotational phase (relative angle of rotation) between the crankshaft 2 and the camshaft 5A, and the relative rotational phase (relative angle of rotation) between the crankshaft 2 and the camshaft 5B.

In other words, when a corresponding spool valve 9A is operated via a linear solenoid 7A, the rotation phase adjustment mechanism 7A does the following according to the operation amount:

(1A) Sprocket 4A or the camshaft 5A is relatively retarded to the crankshaft 2.

(2A) Sprocket 4A or the relative angle of rotation of the crankshaft 2 and the camshaft 5A is maintained.

(3A) Sprocket 4A or the camshaft 5A is relatively advanced to the crankshaft 2.

In the same manner, when a corresponding spool valve 9B is operated via a linear solenoid 8B, the rotational phase adjustment mechanism 7B does the following according to the operation amount:

(1B) Sprocket 4B or the camshaft 5B is relatively retracted to the crankshaft 2.

(2B) Sprocket 4B or the relative angle of rotation of the crankshaft 2 and the camshaft 5B is maintained.

(3B) Sprocket 4B or the camshaft 5B is relatively advanced to the crankshaft 2.

By this type of movement of the rotational phase adjustment mechanisms 7A and 7B, the opening/closing timing of each intake valve that is opened/closed by the cam mounted on the camshafts 5A and 5B can be "relatively retracted" or "relatively advanced" to the rotation of the crankshaft 2. It has already been explained that the opening/closing timing of these intake valves is feedback controlled so that it is a timing that meets the respective operation conditions of the internal combustion engine 1. This movement of the rotational phase adjustment mechanisms 7A and 7B is hydraulically controlled by an oil pressurized and sent from an oil pan 10 to the oil pump 11. An outline of the control structure is illustrated in FIG. 2.

Next, the configuration of the rotation phase adjustment mechanism 7 (7A, 7B) and the hydraulic control structure will be described with reference to FIG. 2.

Figure 2:
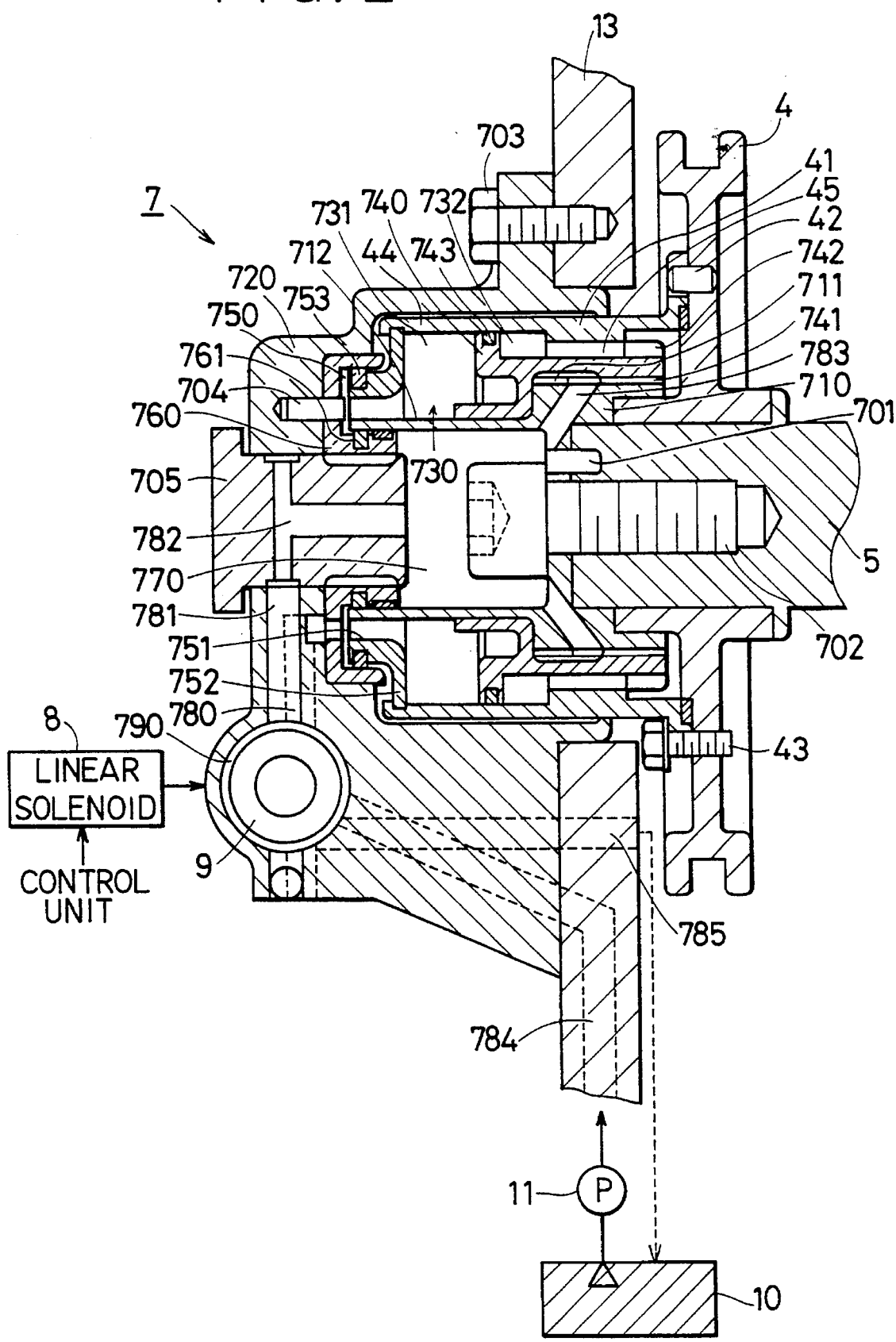
FIG. 2 is a cross-sectional view illustrating a detailed configuration example of a rotation phase adjustment mechanism illustrated in FIG. 1.

As illustrated in FIG. 2, generally cylindrical camshaft sleeve 710 is fixed to the end of the camshaft 5 (5A and 5B) by a pin 701 and a bolt 702. This camshaft sleeve rotates integrally with the camshaft 5. An outer teeth helical spline 711 is formed on part of the circumference of this camshaft sleeve 710. Furthermore, a cylinder portion 712 that projects toward the inner side of a housing 720 is formed on the camshaft sleeve 710. The housing 720 is fixed onto a cylinder head 13 of the internal combustion engine 1 by a bolt 703.

The sprocket 4 (4A and 4B) that is part of the conveyance mechanism mentioned earlier, is placed and supported between the camshaft 5 and the camshaft sleeve 710. Its movement to the axial direction is prevented, but its relative rotation to the camshaft 5 is possible. Generally cylindrical sprocket sleeve 41 that rotates integrally with the sprocket 4 is fixed with a pin 42 and a bolt 43 on this sprocket 4.

A cylinder portion 44 that projects to cover the camshaft sleeve 710 in a housing 720 is formed on this sprocket sleeve 41. An inner teeth helical spline 45 is formed on part of the inner circumference of this cylinder portion 44. A corresponding helical spline 54 is formed to twist in reverse from the outer teeth helical spline 711 of the camshaft sleeve 710. Either the outer teeth helical spline 710 or the inner teeth helical spline 45 can be a zero twisting spline that has linear teeth that are parallel in the axial direction.

On the other hand, on one part of the clearance between the cylinder portion 712 of the camshaft sleeve 710 and the cylinder portion 44 of the sprocket sleeve 41, a ring-shaped space 730 having uniform cross-section in the axial direction is formed. A hydraulic piston 740 is inserted in this space 730. This hydraulic piston 740 can slide in the space 730 while maintaining a close contact state in the axial direction.

An inner teeth helical spline 741 is formed on one part of the inner surface of the hydraulic piston 740 to engage the outer teeth helical spline 711 of the camshaft sleeve 710. An outer teeth helical spline 742 is formed on part of the outer surface of the same hydraulic piston 740 to engage with the inner teeth helical spline 45 of said sprocket sleeve 41. The rotation of the crankshaft 2 conveyed to the sprocket 4 via the timing chain 3 explained earlier is conveyed sequentially to the sprocket sleeve 41, the hydraulic piston 740, the camshaft sleeve 71 and the camshaft 5 with the engagement of the splines.

An oil seal 743 that contacts with the inner surface of the cylinder portion 44 of the sprocket 41 is installed on the outer circumference of the flange portion with the left side end of the hydraulic piston 740. With this hydraulic piston 740, the space 730 is divided into a left advance side hydraulic chamber 731 and a right retract hydraulic chamber 732. The sealing properties of these hydraulic chambers 731 and 732 are maintained by oil seal 743.

On the other hand, an end plate 750 is installed on the opening of the sprocket sleeve 41 illustrated on the left in the figure. This end plate 750 has a cylinder portion 751 and a flange portion 752 installed on the opening end of the sprocket sleeve 41 formed on the right side of this cylinder portion 751 illustrated in the figure. Grooves are formed on the outer circumference of the cylinder portion of the end plate 750, and oil seals 753 are placed in these grooves.

Ring-shaped ring plates 760 fixed to the housing 720 by knock pins 704 are set on the left end of the end plate 750 and camshaft sleeve 710. These ring plates 760 are formed in a U-shaped cross-section so that the cylinder portion 751 of the end plate 750 and cylinder portion 712 of the camshaft sleeve 710 can be rotatably stored inside. Grooves are formed on the outer circumference of the cylinder portion on the inner side of the ring plates 760, and oil seals 761 are placed in these grooves.

Therefore, the oil seals 761 on the ring plate side maintain the sealing properties between the ring plate 760 and the camshaft sleeve 710, and the oil seals 753 on the end plate side maintain the sealing properties between the end plate 750 and the ring plate 760. The sealing properties of the advance side hydraulic chamber 731 are maintained at a favorable state.

Bolts 705 are installed on the center opening of the ring plate 760 and opening of housing 720. By installing these bolts 705, space 770 is formed between the inner circumference of the camshaft sleeve 710 and the camshaft 5.

Next the configuration for the hydraulic control of the rotation phase adjustment mechanism 7 (7A, 7B) with this type of configuration will be explained. The outline of the hydraulic control configuration of the rotation phase adjustment mechanism 7 is as described below.

First, a cross-sectional T-shaped hydraulic path 782 that connects with the space 770 is formed inside the bolt 705. A ring-shaped groove is formed on the outer circumference of the bolt 705, and both radial direction ends of the hydraulic path 782 connect to the ring-shaped groove.

On the housing 720, a hydraulic path 781 that connects with the ring-shaped grooves of the bolts 705 is formed. This hydraulic path 781 is connected to the space 770 via the cross-sectional T-shape hydraulic path 782, and further connects to the retract side hydraulic chamber 732 via hydraulic path 783 formed in the camshaft sleeve 710.

The hydraulic path 780 that connects to said advance side hydraulic chamber 8730 is formed in the same housing 720. The hydraulic paths 780 and 781 each open to the space portion 790 that stores the spool valve 9 in the housing 720. In addition, a hydraulic supply path 784 that supplies the oil pressure-fed from the oil pan 10 by the oil pump 11 and a hydraulic release path 785 that returns the oil to the oil pan 10 are opened into this space portion 790. The hydraulic paths 780 and 781 and the hydraulic supply path 784 and hydraulic release path 785 are changed over and controlled as described below according to the operation state of the spool valve 9.

(1) When the spool valve 9 (9A, 9B) is operated to the first position by linear solenoid 8 (8A, 8B):

The hydraulic path 780 and the hydraulic release path 785 are connected to the advance side hydraulic chamber 731, and the hydraulic path 781 and the hydraulic supply path 784 are connected to the retract side hydraulic chamber 732. In other words, while the pressure-fed oil is supplied to the retract side hydraulic chamber 732, the hydraulics in the advance side hydraulic chamber 731 are released. Thus, the hydraulic piston 740 moves to the left side of FIG. 2, and the camshaft 5 (5A, 5B) retracts relatively from the sprocket 4 (4A, 4B) or from the crankshaft 2.

(2) When the spool valve 9 (9A, 9B) is operated to the second position by the linear solenoid 8 (SA, 8B):

The hydraulic path 780 connected to the advance side hydraulic chamber 731, and the hydraulic path 781 connected to the retract side hydraulic chamber 732 both close. In this case, movement of the oil is prohibited, and hydraulic piston 740 is also kept at the same position. Thus, the relative angle of rotation of camshaft 5 (5A, 5B) and sprocket 4 (4A, 4B) or crankshaft 2 is maintained.

(3) When the spool valve 9 (9A, 9B) is operated to the third position by linear solenoid 8 (8A, 8B):

The hydraulic path 780 and the hydraulic supply path 784 are connected to the advance side hydraulic chamber 731, and the hydraulic path 781 and hydraulic release path 785 are connected to the retract side hydraulic chamber 732. In other words, while the pressure-fed oil is supplied to the advance side hydraulic chamber 731, the hydraulics of retract side hydraulic chamber 732 is released. Thus, the hydraulic piston 740 moves to the right side of FIG. 2, and the camshaft 5 (SA), 5B) relatively advances to the sprocket 4 (4A, 4B) or to the crankshaft 2.

As has been explained, the details of the above controls (1) to (3) match the operation details of the rotation phase adjustment mechanism 7 (7A, 7B) described as (1A) to (3A) or (1B) to (3B) earlier.

Figure 3:
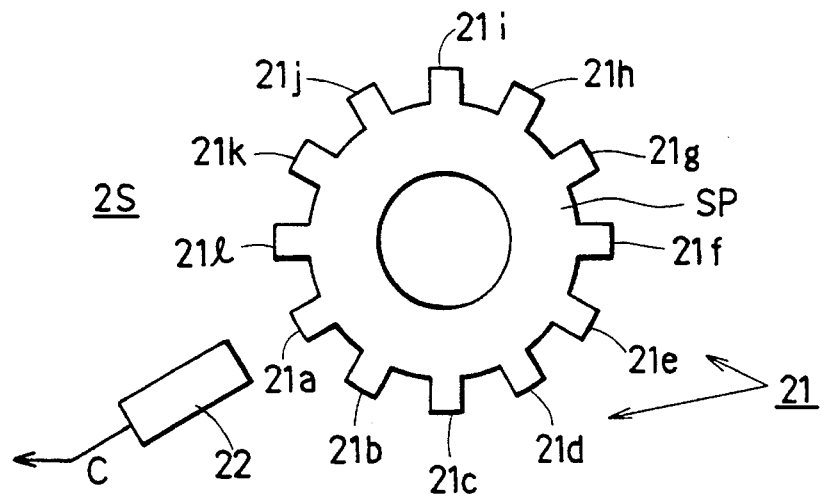
FIG. 3 is a cross-sectional view illustrating a detailed configuration example of a crank angle sensor illustrated in FIG. 1.

In the device of this embodiment illustrated in FIG. 1, the crankshaft 2 has multiple-pulse (12 in this embodiment) inductors 21 (21a to 21l) formed at even angular intervals as shown in the enlarged view in FIG. 3. These pulse inductors 21 are integrally supported by a support member SP. Pulse generator 22 that generates a pulse signal each time the inductors 21 pass is installed near the crankshaft 2. Normally this pulse generator 22 is configured of an electromagnetic sensor, electromagnetic resistance element sensor, Hall sensor or optical sensor. For convenience sake, the pulse inductors 21 and the pulse generator 22 are referred to as crank angle sensor 2S, and the output pulse signal is referred to as crank signal C in the following explanation.

On the other hand, in the device of this embodiment illustrated in FIG. 1, three pulse inductors 51A (51Aa, 51Ab, 51Ac) are installed at angular intervals of 120° (=240° CA interval) on the first bank camshaft 5A as illustrated in FIG. 4(*a*). These pulse inductors 51A are also integrally supported by support member SPA. A pulse generator 52A that generates a pulse signal each time inductors 51Aa, 51Ab and 51Ac pass is fixed near the camshaft 5A.

In the same manner, three pulse inductors 51B (51Ba, 51Bb, 51Bc) are installed at angular intervals of 120° (=240° CA interval) on the first bank camshaft 5A as illustrated in FIG. 4(*b*). These pulse inductors 51B are also integrally supported by support member SPB. Pulse generator 52B that generates a pulse signal each time inductors 51Ba, 51Bb and 51Bc pass is fixed near the camshaft 5B.

Normally these pulse generators 52A and 52B are configured of an electromagnetic sensor, electromagnetic resistance element sensor, Hall sensor or optical sensor. For convenience sake, the pulse inductors 51 (51A and 51B) and the pulse generators (52A and 52B) are referred to as cam angle sensor 5S (5AS and 5BS), and the output pulse signals are referred to as cam signals A or B in the following explanation.

Figures 4A, 4B:
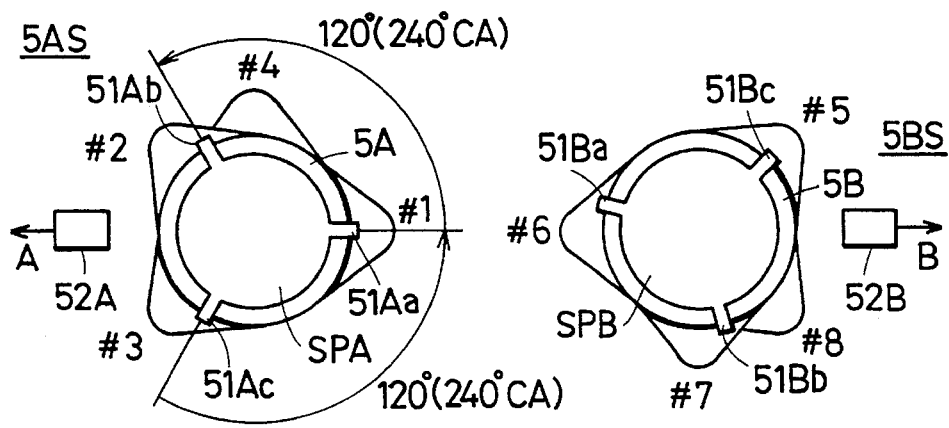
FIGS. 4(a) and 4(b) are cross-sectional views illustrating detailed configurations of cam angle sensors illustrated in FIG. 1.
Figure 5:
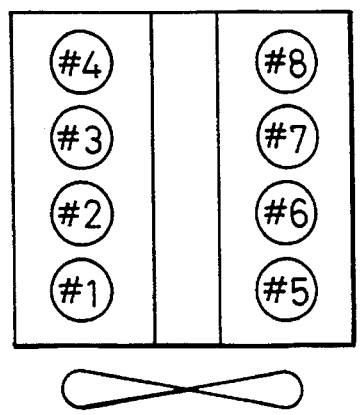
FIG. 5 is a top plan view illustrating a cylinder arrangement of V-type 8-cylinder internal combustion engine.

The V-type 8-cylinder double overhead cam internal combustion engine 1 to which this embodiment illustrated in FIG. 4 is applied has a cylinder layout as illustrated in FIG. 5 for example. It is assumed that the first cylinder #1 to the eighth cylinder #8 are ignited in the order of "#1"- "#5"- "#4"-"#2"- "#6"- "#3"- "#7"- "#8".

In the device of this embodiment illustrated in FIG. 1, a reference position sensor 12 that outputs one pulse signal per one rotation of the crankshaft 2 is installed on a distributor (not illustrated) that is driven by the camshaft 6A for the exhaust valve for one bank (first bank in this embodiment). The pulse signals output from this reference position sensor 12 are referred to as the reference position signal G in the following description.

The crank signal C, the cam signals A and B, and the reference signal G output from each of the above signals, are led into a control unit 100 configured of a microcomputer, etc., and then supplied to the opening/closing timing control for each intake valve explained earlier.

In the device of this embodiment, basically to control the valve timing, the control unit 100 usually has a reference angle signal generation portion 101, and a first and a second control portions 110 and 120 to execute valve timing control separately for the first and second banks of the engine 1.

The functions of each part of the control unit 100, and the valve timing control executed by these parts will be explained in the following section.

First, the reference angle signal generation portion 101 is a portion that generates the reference angle signal CC for detecting the phase difference explained later based on the crank signal C and the reference position signal G.

When generating this reference angle signal CC, the crank signal C output 24 times during 720° CA (crank angle) are led in and processed. As a result of the processes, three signals PC1, PC2 and PC3 that form the 240° CA interval are generated as the reference angle signal CC, The generation procedure for the reference angle signal CC by the reference angle signal generation portion 101 is shown in FIG. 6, and the generation format of the reference angle signal CC is shown in FIG. 7.

Figure 6:
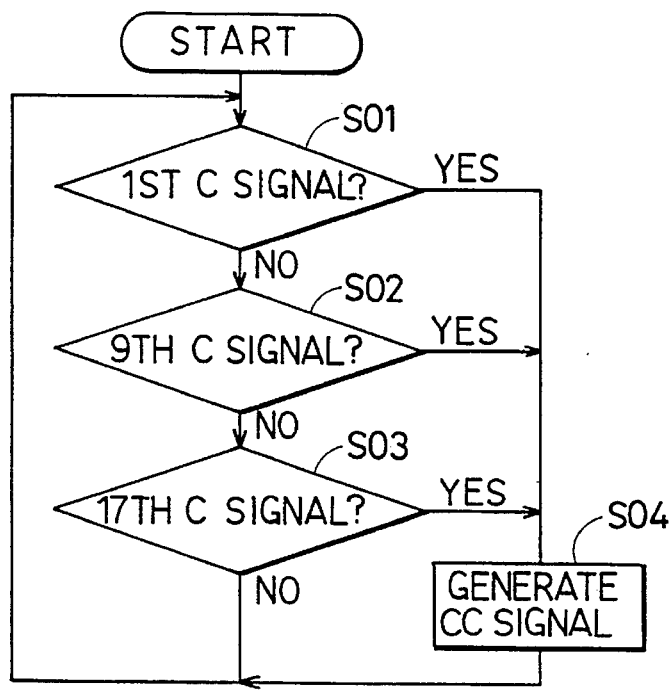
FIG. 6 is a flow chart indicating the generation procedure of a reference angle signal by the device of the first embodiment.
Figure 7:
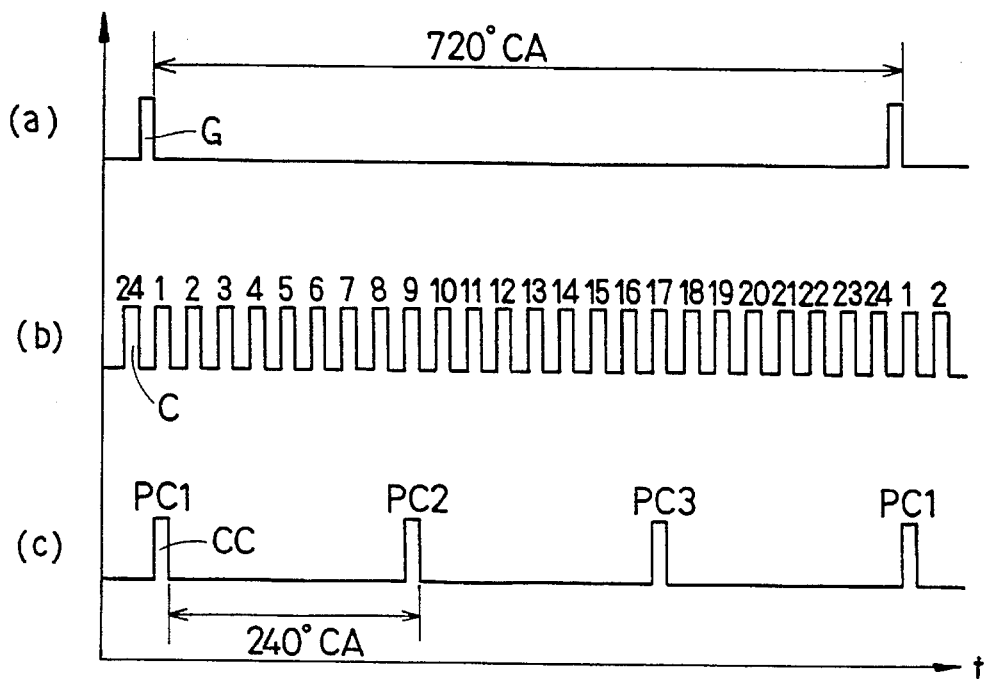
FIGS. 7a–c are timing charts indicating the generation procedure of a reference angle signal by the device of the present embodiment.

In other words, as shown in FIG. 6, the attribute of the crank signal C is executed based on the reference position signal G at the reference angle signal generation portion 101. After reference position signal G, the reference angle signals CC are generated (step S04) according to the crank signal C for the first pulse (step S01), the crank signal C for the ninth pulse (step S02), and the crank signal C for the 17th pulse (step S03). With this, the three signals PC1, PC2 and PC3 are output at 240° CA intervals as the reference angle signals CC from the reference angle signal generation portion 101. FIG. 7 shows in (a) and (b) the generation format of the reference position signal G and the crank signal C, respectively.

As explained, the reference angle signals CC (PC1 to PC3) corresponding to the three pulse inductors 51Aa to 51Ac installed at even intervals of 240° CA on the camshaft 5B or the three pulse inductors 51Ba on the 51Bc installed at even intervals of 240° C. on the camshaft 5B are generated based on the crank angle signals C. In other words, if the number of reference angle signal pulses CC generated while the crankshaft 2 rotates once is N, the number of pulse inductors arranged on the angle camshaft 5A and 5B and the lead-in process are set so that the number of pulses output from the cam angle sensors 5AS and 5BS while the camshafts 5A and 5B are 2N. This value N is set on the assumption that the following conditions will be satisfied when the maximum phase adjustment amount (angle) of the end rotation phase adjustment mechanisms 7A and 7B is $\theta max°$ CA:

$$N < 360°CA/\theta max°CA$$

With this setting, the relative angle of rotation with the crankshaft 2 and camshaft 5A to the valve timing in the first bank can be obtained based on the difference of the each pulse output of the cam signal A from the cam angle sensor 5AS and the pulse signals PC1 to PC3 that configure the reference angle signal CC.

The device in this embodiment obtains the relative angle of rotation of the crankshaft 2 and camshaft 2 for each bank and controls each valve timing via the first control portion 110 and the second control portion 120 illustrated in FIG. 1 as the control device 100.

The first control portion 110 and the second control portion 120 are illustrated in FIG. 1 as the first control portion 110 for the first bank for convenience. This portion is configured of a phase difference detection portion 111, a compensation value computation and a map control portion 112, a compensation value map (memory 113), a relative angle of rotation computation portion 114, a target value computation portion 115 and a control amount computation portion 116.

Figure 8:
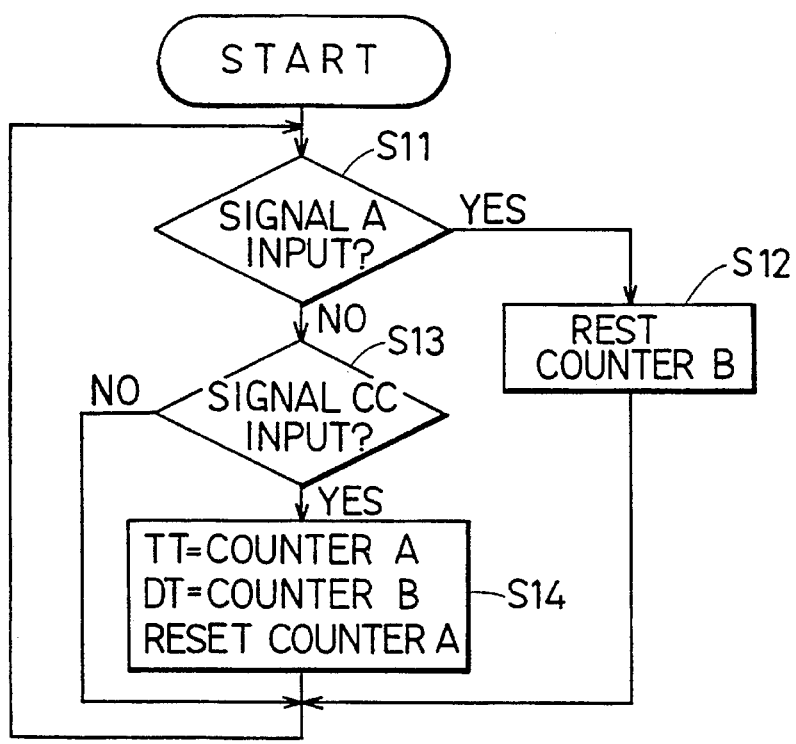
FIG. 8 is a flow chart indicating the phase difference detection procedure of a cam signal and a reference angle signal by the device of the first embodiment.
Figure 9:
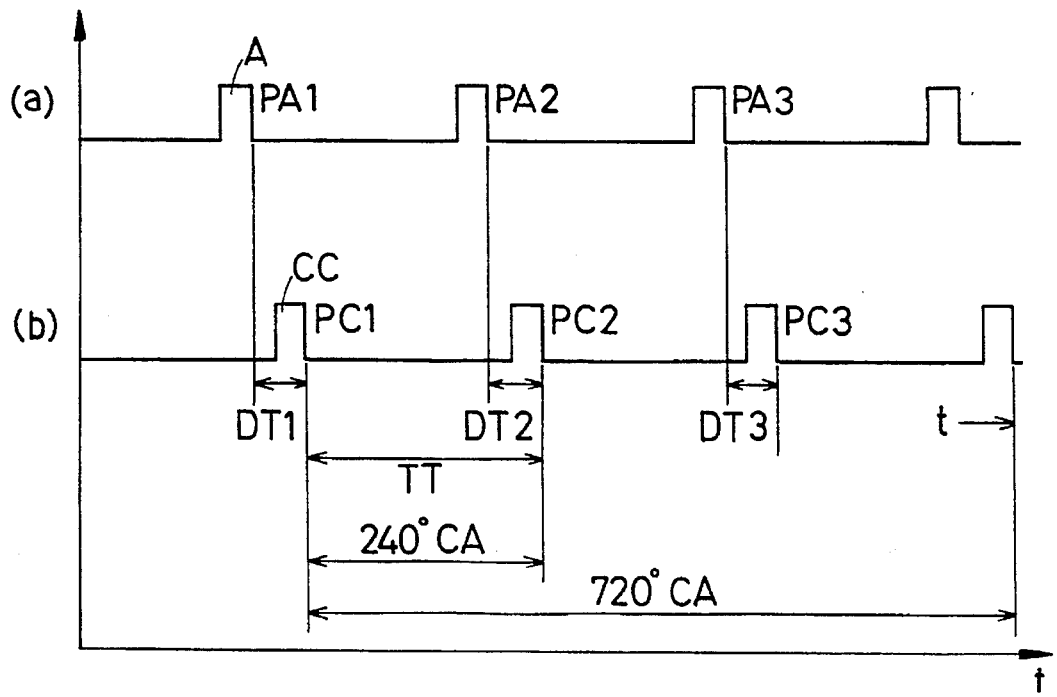
FIGS. 9a–b are timing charts indicating the phase difference detection procedure of the cam signal and the reference angle signal by the device of the first embodiment.

The phase difference detection portion 111 is the portion that detects the generated reference angle signal CC (PC1 to PC3), and based on the first bank cam signal A used as the representative one here, detects the phase difference DT of these signals and cycle TT of the reference angle signal CC. The detection procedure of the phase difference DT and cycle TT by the phase difference detection portion 111 is shown in FIG. 8, and the detection format of the phase difference DT and cycle TT is shown in FIG. 9.

The phase difference detection portion 111 has a counter A to measure the cycle TT and a counter B to measure the phase difference DT built-in. At phase difference detection portion, when the cam signal A or the reference angle signal CC is input, the detection of cycle TT and the phase difference DT is detected with the procedure shown in FIG. 8.

For example, assume that cam signal A has been input (step S11). At the phase difference detection portion 111, the counter B is reset (step S12), and the input of the reference angle signal CC is waited for. When reset, the count value of counter B is cleared to "0", and new counting starts at that point.

When the reference angle signal CC is input (step S13), the following process is done by the phase difference detection portion 111:

(1) The count value of the counter A is output as the detection value of cycle TT of the reference angle signal C.

(2) The count value of the counter B is output as the phase difference DT of the cam signal A and the reference angle signal CC. At the same time, a counter A is reset (step S14). When reset, the count value of the counter A is cleared to "0", and new counting starts at that point.

By repeating this type of process at the phase difference detection portion 111, the target phase difference DT of the cam signal A and the reference angle signal CC, and the cycle TT of the reference angle signal CC are sequentially detected with the format shown (a) and (b) in FIG. 9. In this FIG. 9, the following relation is established with the pulse inductors 51Aa and 51Ac arranged on the camshaft 5A illustrated in FIG. 4(a) for example:

Cam signal A inducted by the pulse inductor 51Aa=>pulse signal PA1

Cam signal A inducted by the pulse inductor 51Ab=>pulse signal PA2

Cam signal A inducted by the pulse inductor 51Ac=>pulse signal PA3

Phase difference of the pulse signal PA1 and the first pulse signal PC1 of the reference angle signal CC=>phase difference DT1

Phase difference of the pulse signal PA2 and the first pulse signal PC2 of the reference angle signal CC=>phase difference DT2, and Phase difference of the pulse signal PA3 and the first pulse signal PC3 of the reference angle signal CC=>phase difference DT3.

As can be seen from FIGS. 4(a) and 4(b), in the V-type 8-cylinder internal combustion engine 1 in this embodiment, each of the four cams installed for each camshaft, are aligned so that there are no angle-wise cyclic properties or no equal angular intervals therebetween looking from the axial direction of the camshaft.

It was also explained that the drive torque or angular velocity of these camshafts normally changes due to the change in the force applied on the profile surface of the cam when the valve opens and closes.

Figure 10:
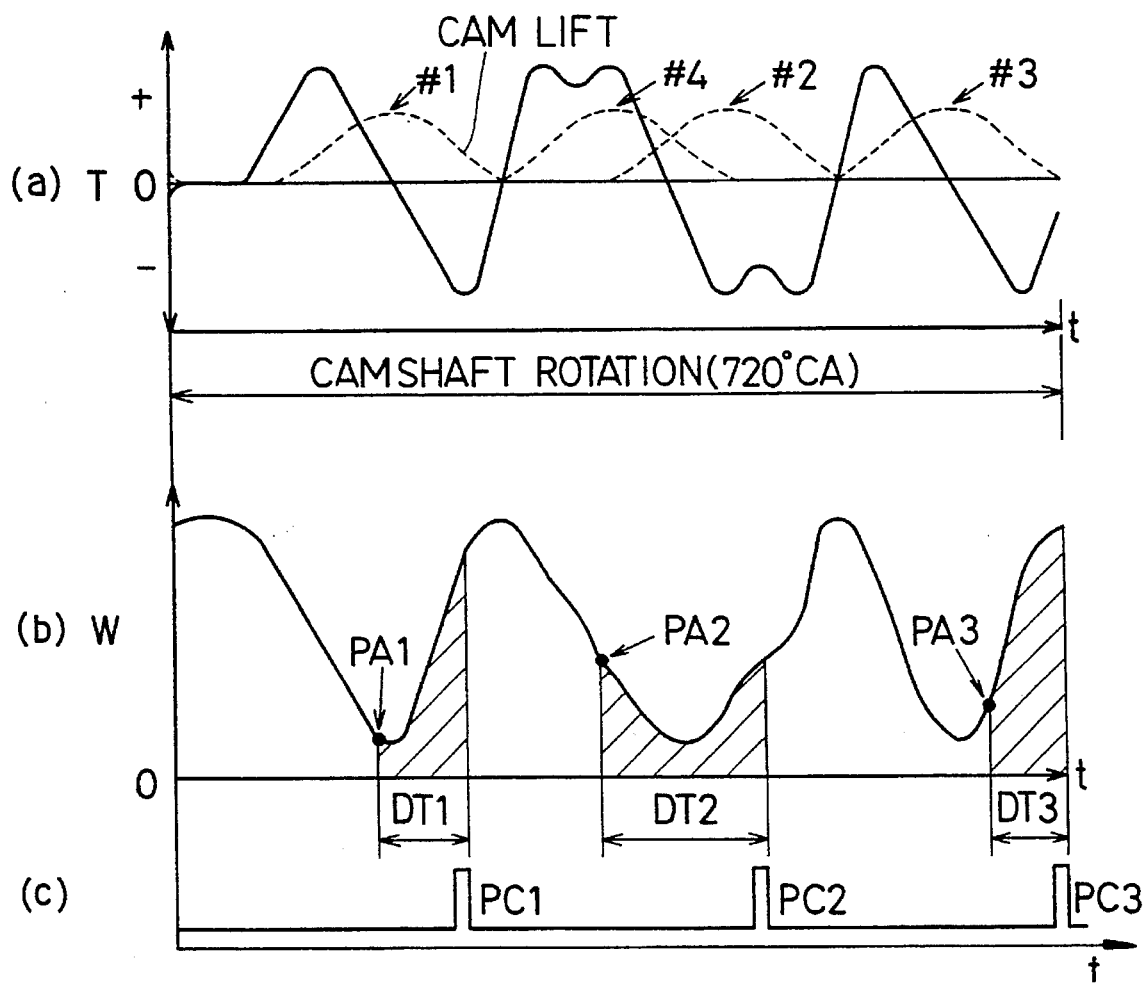
FIGS. 10a–c are timing charts indicating the relation of a camshaft drive torque and an angular velocity fluctuation in V-type 8-cylinder internal combustion engine.

In the V-type 8-cylinder internal combustion engine 1, for example, for the first bank camshaft 5A, it can be confirmed that the drive torque T and angular velocity ω fluctuate without cyclic properties as shown in FIG. 10. The dotted line in (a) of FIG. 10 indicates the lift amount of each cam illustrated in FIG. 4(a) for reference. The fluctuation of the drive torque T illustrated in (a) of FIG. 10 has a differential relation of the angular velocity ω illustrated in (b) of FIG. 10.

In this manner, as the camshaft drive torque T and angular velocity ω fluctuate without cyclic properties, and as the pulse inductors 51Aa to 51Ac are installed at even angular intervals to the camshaft, variation occurs in the detected phase differences DT1 to DT3 with the format shown in (b) of FIG. 10.

Thus, with the device in this first embodiment, this variation in the phase differences DT1 to DT3 is electrically compensated with the compensation value computation and map control portion 112 and the compensation value map 113 of the first control portion 110.

The compensation value computation and map control portion 112 obtain the compensation value ΔDT (n) to create an even value of the phase differences based on the phase differences DT1 to DT3 detected via the phase difference detection portion 111. At the same time, this portion stores and reads out obtained compensation value into and from the compensation value map 113. Normally, the detected phase differences DT1 to DT3 fluctuate according to the speed of the internal combustion engine 1. Thus, the compensation value ΔT (n) is obtained for each engine with the following procedure based on the speed Ne detected via the speed sensor not illustrated.

(1) The speed Ne of the internal combustion engine 1 is gradually increased from a low speed in the state with the rotation phase adjustment mechanism 7 (7A, 7B) fixed.

(2) The detected values are sequentially sampled for the phase differences DT1 to DT3 according to each speed.

(3) Then based on each value of the phase differences DT1 to DT3 sampled, with a relation such as:

DT3<DT1<DT2 illustrated in FIG. 10, the compensation value ΔDT(n) is computed as follows using, for example, phase difference DT2 as a reference:

ΔDT (3)=DT2−DT3

ΔDT (1)=DT2−DT1

ΔDT (2)=0

(4) Each compensation value ΔDT (n) computed in this manner, is stored in compensation value map 113 according to each corresponding speed Ne value.

Figure 11:
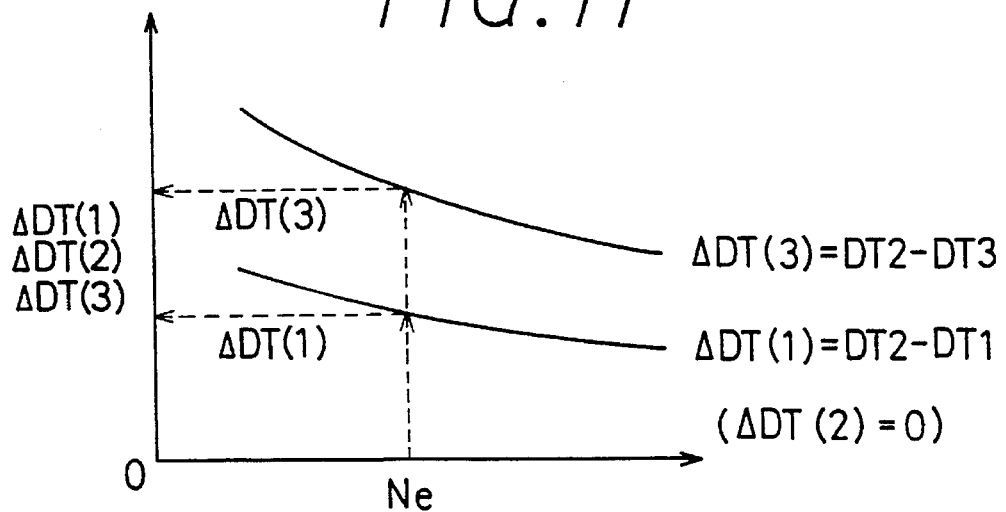
FIG. 11 is a graph indicating an example of maps stored in the compensation map illustrated in FIG. 1.

With the above process by the compensation value computation and map control portion 112, the obtained compensation value ΔDT (n) obtained with the format illustrated in FIG. 11 for example is stored in the compensation value map 113.

At this compensation value computation and map control portion 112, when valve timing control is executed by the device in the embodiment, the compensation value ΔDT (n) to each speed Ne of the internal combustion engine 1 is read out with the format shown in FIG. 11. The read out compensation value ΔDT (n) is read out to the relative angle of the rotation computation portion 114.

The relative rotation computation portion 114 is the portion that computes the relative angle of rotation T1 with the crankshaft 2 and camshaft 5A based on the phase differences DT1 to DT3 and the cycle TT of the reference angle signal CC sequentially detected by the phase difference detection 111 and the compensation value ΔDT (n) supplied from the compensation value computation and map control portion 112.

Figure 12:
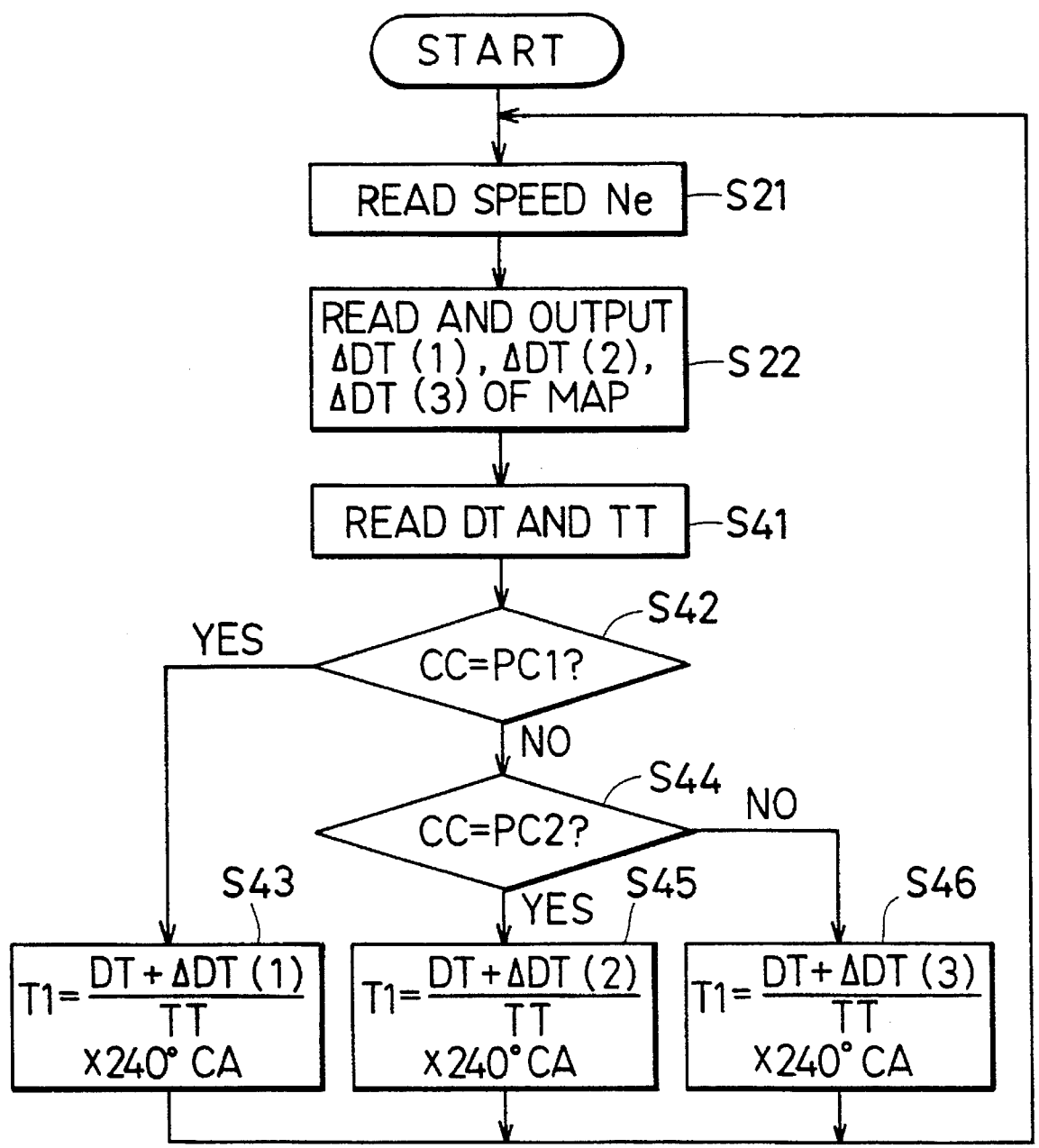
FIG. 12 is a flow chart indicating the compensation value map control procedure and detected relative angle of rotational computation procedure by the device of the first embodiment.

The process during the valve timing control by the compensation value computation and map control portion 112 and the computation process procedure for the relative angle of rotation T1 by said relative angle of rotation computation portion 114 are shown in FIG. 12.

In other words, as explained below, the compensation value computation and map control portion 112 obtains the speed Ne of the internal combustion engine 1 from the rotation sensor (not illustrated) (step S21), and reads in the compensation value ΔDT (n) corresponding to the obtained speed Ne value from the compensation value map 113. This read-in compensation value ΔDT (n) is output to the relative angle of rotation computation portion 114 (step S22).

On the other hand, at the relative rotation computation portion 114, the detected phase differences DT1 to DT3 and reference angle signal cycle TT are obtained in addition to the obtained compensation value ΔDT (n) (step S41). Then, based on the judgment of which pulse the reference angle signal CC currently is, the relative angle of rotation T1 at the bank (bank 1) is computed with the following format.

In other words, if it is determined that the reference angle signal CC is currently the first pulse PC1 (step S42), the relative angle of rotation T1 is computed (step S43) with the following equation using the compensation value ΔDT (1):

$$T1=\{(DT+\Delta DT(1))/TT\}\times 240° \text{ CA}.$$

If the same reference angle signal CC is determined to currently be the second pulse PC2 (steps S42 and S44), the relative angle of rotation T1 is computed (step S45) with the following equation using the compensation value ΔDT (2):

$$T1=\{(DT+\Delta DT(2))/TT\}\times 240° \text{ CA}.$$

If the same reference angle signal CC is determined to currently be the third pulse PC3 (steps 52 and S44), the relative angle of rotation T1 is computed (step S46) with the following equation using compensation value ΔDT (3):

$$T1=\{(DT+\Delta DT(3))/TT\}\times 240° \text{ CA}.$$

The occurrence order of the reference angle signal CC and cam signal A are fixed, and thus, which pulse the reference angle signal CC is currently at can be determined by whether the first pulse is PC1 to PC3. Due to this type of determination using the relative angle of rotation computation portion 114, reference signals to identify whether the pulse is the first or sequential pulse can be issued from the reference angle signal generation portion 101 to the relative angle of rotation computation portion 114.

The relative angle of rotation T1 obtained in this manner with the relative angle of rotation computation portion 114 is next applied to the control amount computation portion 116.

The control amount computation portion 116 is the portion that computes the control amount (adjustment amount) of the rotational phase adjustment mechanism 7 (7A) based on the target value, or target relative angle of rotation TG, applied from the target value computation portion 116 and the relative angle of rotation, or detected relative angle of rotation T1, applied from the relative angle of rotation computation portion 114. This rotational phase adjustment mechanism 7 control amount is computed as the linear solenoid 8 (8A) drive amount.

First, the method for computing the target relative angle of rotation TG with the target value computation portion 115 will be explained.

Figure 13:
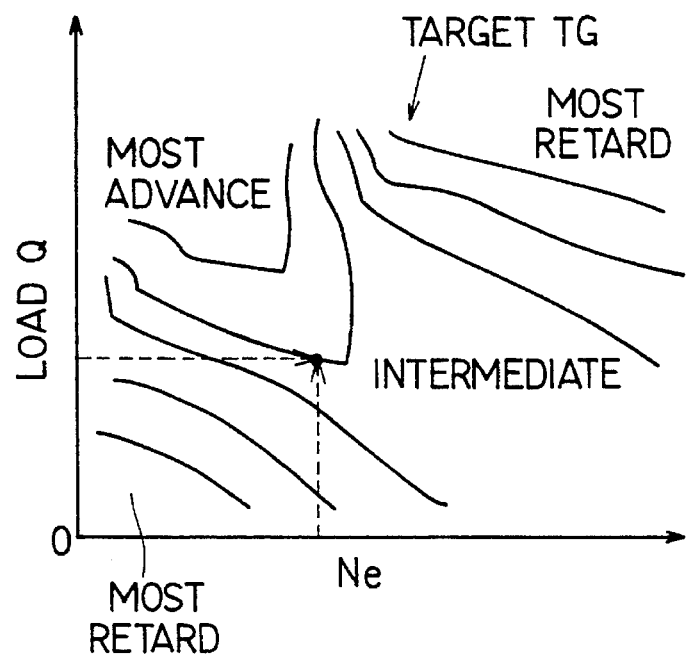
FIG. 13 is a graph indicating an example of maps used to compute the target relative angle of rotation.

The target value computation portion 115 has a map (memory) built-in as shown in FIG. 13. Furthermore, the target value computation portion 115 inputs the information from the rotation sensor on the speed Ne, and the information from the airflow meter (not illustrated) of the internal combustion engine 1 on the intake amount Q that indicates the load of the internal combustion engine 1. From the relation of this input information and the built-in map, the optimum relative angle of rotation of the crankshaft 2 and camshaft 5 (5A) corresponding to each operation condition of the internal combustion engine 1 is computed as the target relative angle of rotation TG.

Here, the map is expressed by the uniform angle line corresponding to the adjustable angle range by the rotational phase adjustment mechanism 7 as illustrated in FIG. 13. One of the angles in the range is obtained according to the relation of the internal combustion engine speed Ne and the load (intake amount Q). As shown in FIG. 13, the target relative angle of rotation TG in the adjustable angle range is obtained by the rotational phase adjustment mechanism 7. The obtained target relative angle of rotation TG is interpolated and calculated as required.

Figure 14:
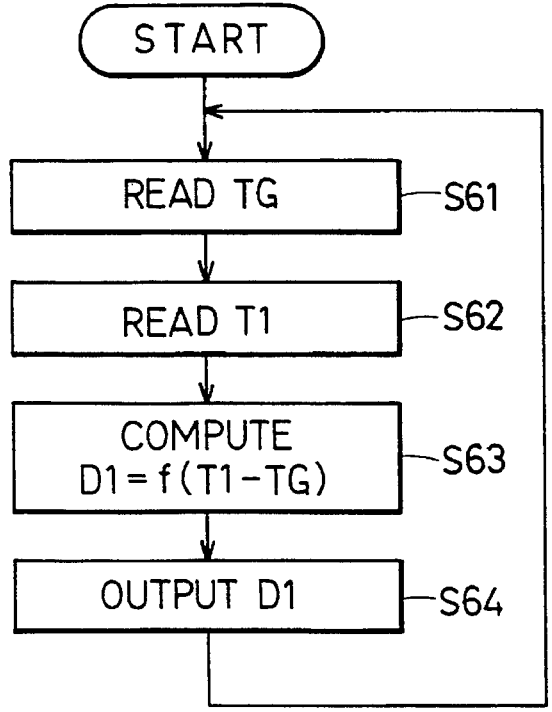
FIG. 14 is a flow chart indicating the computation procedure of the control amount of rotational phase adjustment mechanism by the device of the first embodiment.

In the control amount computation portion 116, the control amount of the rotational phase adjustment mechanism 7 (7A), or the drive amount of the linear solenoid 8 (8A) is computed based on the obtained target relative angle of rotation TG and the detected relative angle of rotation T1 with the procedure shown in FIG. 14.

In other words, when target relative angle of rotation TG is applied from the target value computation portion 115 and the detected relative angle of rotation T1 is applied from the relative angle of rotation computation portion 114, the control amount computation portion 116 takes in these values (step S61 and S62), and then obtains the difference of the detected relative angle of rotation T1 and the target relative angle of rotation TG. PID (Proportional, Integral and Differential) compensation is executed appropriately on this obtained difference value, and the bank (first bank) control amount D1 is computed with the following expression (step S63):

$$D1=f(T1-TG).$$

In particular, by enforcing fine compensation (D compensation) to the difference values (T1–TG), the overshooting is compensated and a stable feedback control is ensured.

The control amount D1 computed in this manner is output to linear solenoid 8A (step S64), and the solenoid 8A is driven by the amount corresponding to this value D1. In response to this linear solenoid drive amount (operation amount), the rotational phase adjustment mechanism 7A functions in the following manner as explained earlier:

(1A) The camshaft 5A is relatively retarded to the crankshaft 2;

(2A) The relative angle of rotation of the crankshaft 2 and camshaft 5A is maintained; and (3A) The camshaft 5A is relatively advanced to the crankshaft 2.

The relative rotation angle of the crankshaft 2 and the camshaft 5A corrected in this manner by the rotational phase adjustment mechanism 7A is reflected immediately on the phase difference DT of the cam signal A and reference angle signal CC detected with the phase difference detection portion 111. If further corrections are required for the relative angle of rotation of the crankshaft 2 and the camshaft 5A, the angle can be adjusted by executing the above series of processes with the compensation value compensation and map control portion 112, the relative angle of rotation computation portion 114, the target value compensation portion 115 and the control amount computation portion 116. Of course, the above process with the first control portion 110 will be executed in the same manner in the second control portion 120.

Thus with the device according to the first embodiment no matter what format the pulse inductors are installed on the camshaft 5 (5A and 5B) of the internal combustion engine 1 configured in the V-shaped 8 cylinders, the variation of the cam signal A or B to the reference angle signal CC caused by this installation position is easily and accurately compensated by the compensation value stored in the compensation value map 113. Thus, the opening/closing timing of the intake valves is controlled to an optimum timing by the feedback control. The occurrence of hunting, explained earlier, is also suppressed accurately.

Furthermore, with the device according to the embodiment, as the compensation value is obtained by executing an experimental run of each engine, the stored compensation value becomes the value most suitable to the characteristics of each corresponding internal combustion engine.

In addition to the compensation values, general values obtained through experiments of each internal combustion engine type can be incorporated.

Furthermore, a configuration that always incorporates the compensation value map 113 or the relative angle of rotation computation portion 115 that actually executes the compensation computation is not necessarily required for the phase compensation means. As the phase compensation means, the following one will suffice:

that electrically (software-wise) compensates the phase difference in the cam signal and the reference angle signal that occurs due to the mechanical (hardware-wise) installation position of the pulse inductors. Other examples include configurations incorporating:

(a) A first computation means that uses one of the phase differences of the cam signal and the reference angle signal as a reference as a difference value or ratio value and computes the compensation value for the variation in the phase difference, or (b) A second computation means that compensates the phase difference of the cam signal and the reference angle signal phase difference other than that used as the reference by adding or multiplying each of the corresponding values of the computed compensation values.

Next, the second embodiment of the valve timing control device for internal combustion engine according to the present invention will be explained.

Figure 15:
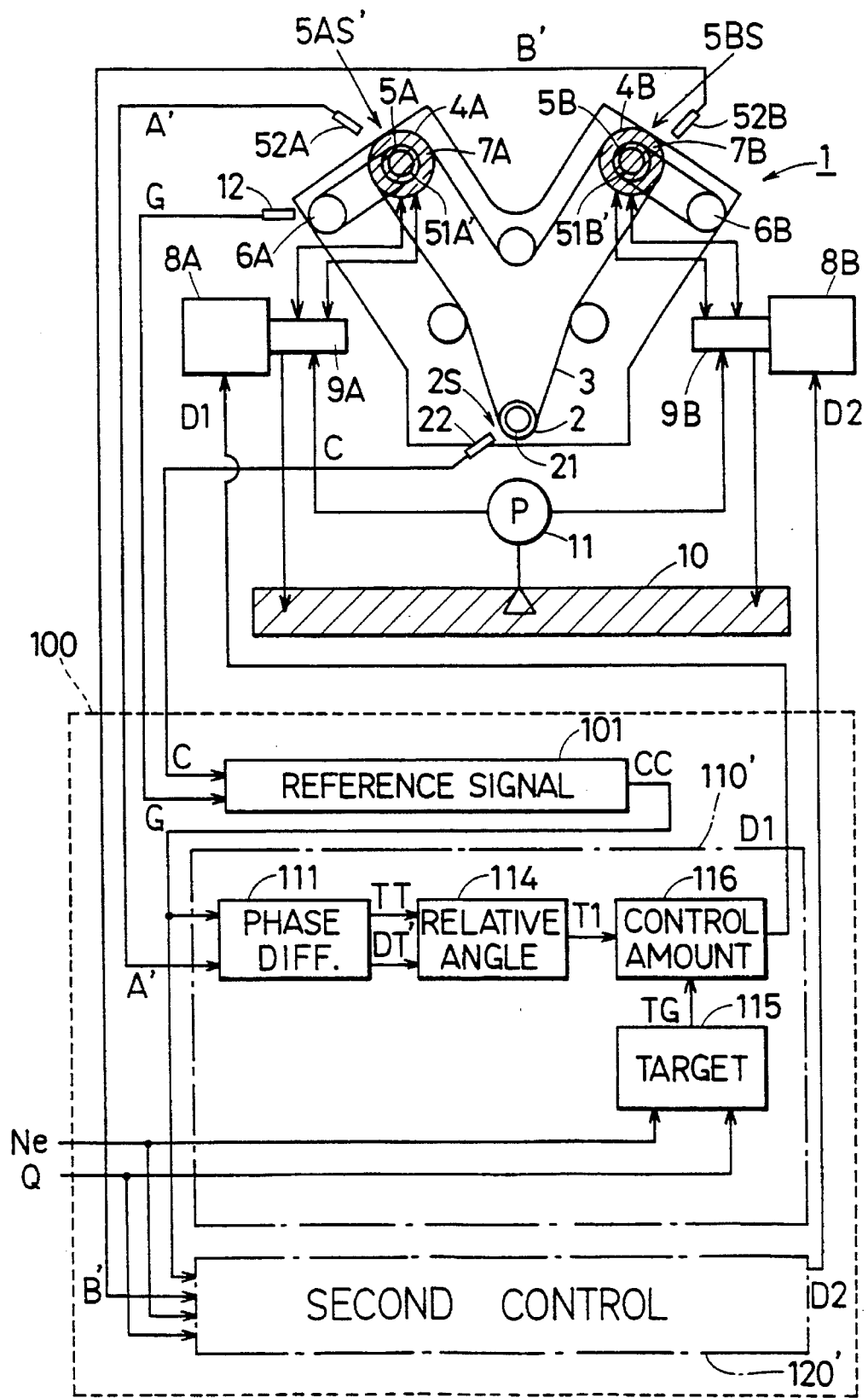
FIG. 15 is a block diagram illustrating the second embodiment of the valve timing control device for internal combustion device according to the present invention.
Figure 16:
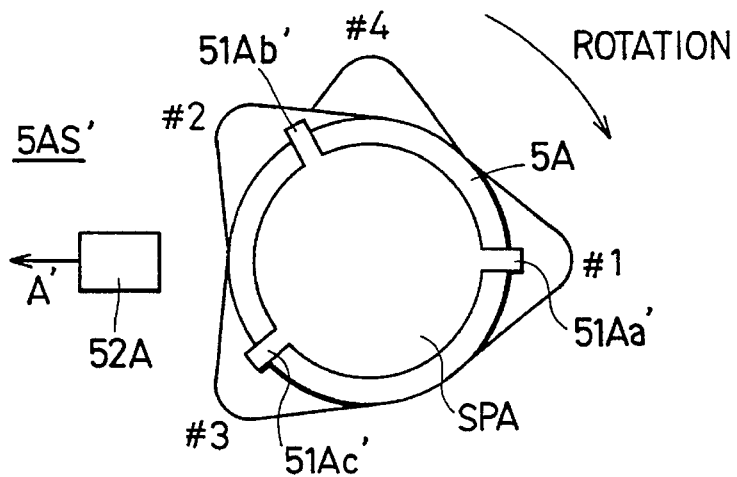
FIG. 16 is a cross-sectional view illustrating a detailed configuration example of the cam angle sensor illustrated in FIG. 15.

The configuration of the device according to the second embodiment is shown in FIGS. 15 and 16. The elements that correspond to the elements of the first embodiment illustrated in FIGS. 1 to 4 are illustrated with the same numerals and the like in FIGS. 15 and 16, and the explanation of these elements has been omitted for brevity.

The device according to the second embodiment is also applied to the V-type 8-cylinder double overhead cam-type internal combustion engine having the same cylinder arrangement as shown in FIG. 5. The opening/closing timing of the intake values is controlled. In this device according to the second embodiment, the compensation value computation and map control portion and compensation value map as shown as the first control portion 110' in FIG. 15 are not used. Instead, the variation in the phase difference is compensated mechanically (hardware-wise) by the configuration of a cam angle sensor 5AS' or 5BS'. The configuration of this cam angle sensor is shown in FIG. 16 as cam sensor 5AS' for the first bank.

In other words as shown in FIG. 16, this cam angle sensor 5AS' is installed under position conditions deviated by the angle so that three pulse inductors 51Aa', 51Ab' and 51Ac' can absorb the angular velocity fluctuation of the camshaft 5A from the position corresponding angle-wise to the reference angle signal CC for the camshaft 5A. In other words, if each cam installed on the camshaft 5A is arranged in a row with no angle-wise cyclic properties looking from the axial direction of the camshaft 5A, such as in the V-type 8-cylinder internal combustion engine for which this device is targeted, these pulse inductors 51Aa', 51Ab' and 51Ac' will be installed at uneven intervals to the camshaft 5A.

Thus, if each pulse inductor is installed at an even angular interval as shown in FIGS. 4(a) and 4(b), variation will occur in the detected phase differences DT1 to DT3 according to the non-cyclic angular velocity fluctuation of camshaft 5A as shown in FIG. 10(b). In this case, if each pulse inductor is installed at an even interval, the integral value of the angular velocity $\omega$ applied on detected phase differences DT1 to DT3, or in other words, the size of the area indicated with the shading lines in FIG. 10(b) will become constant. However, as long as this type of variation occurs in the phase differences DT1 to DT3, the feedback control that is reliable for valve timing control cannot be guaranteed unless the variation is compensated to be uniform.

Thus, as explained earlier, the device in this second embodiment positively works to deviate the pulse inductors 51Aa', 51Ab' and 51Ac' to the conditions even if they are installed at an uneven interval to the camshaft 5A. Thus, "position conditions in which position is deviated only by angle in which the camshaft 5A angular velocity fluctuation can be absorbed at position corresponding angle-wise to the reference angle signal CC" means the installation conditions of the pulse inductors that can constantly obtain an equal time difference (phase difference) between the reference angle signal CC and corresponding cam signal A. The relation of the cam signal A' (PA1' to PA3') output from the cam angle sensor 5AS' and the reference angle signal CC (PC1 to PC3) based on the pulse inductors installed under these conditions is shown in FIG. 17 in comparison with FIG. 10.

Figure 17:
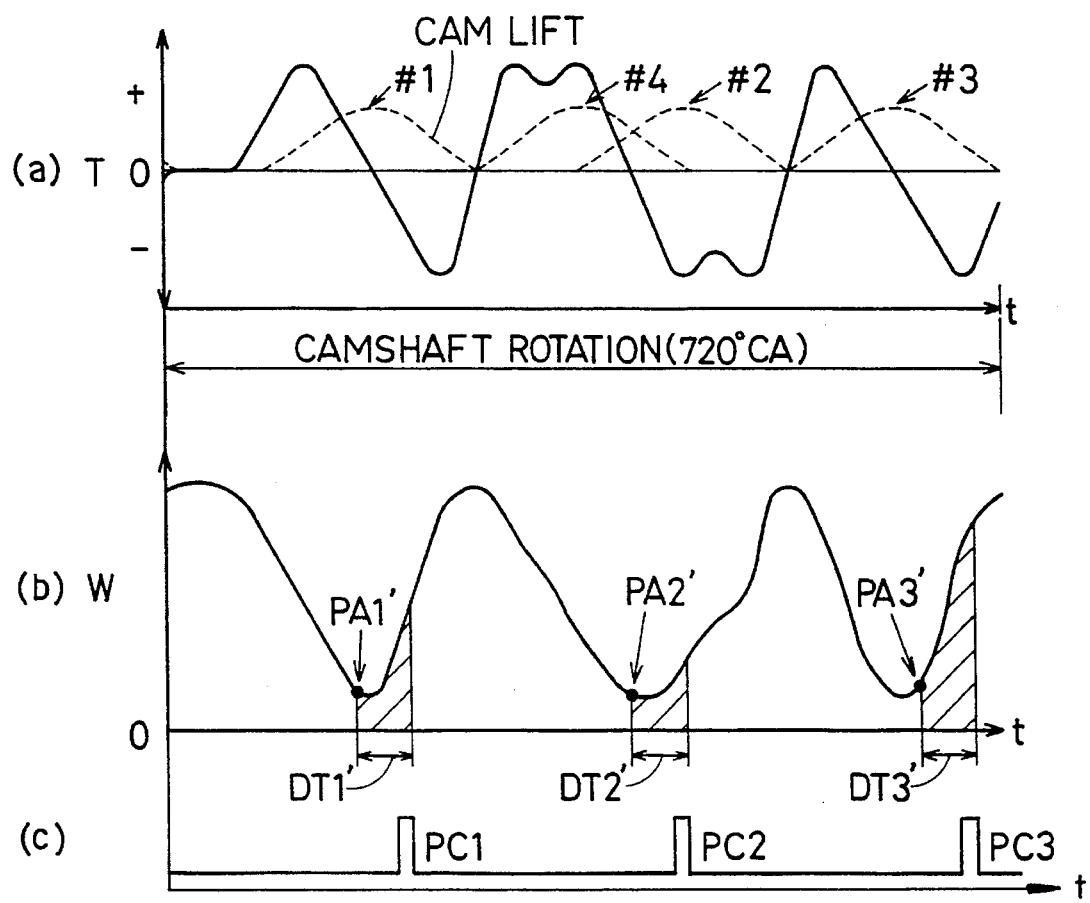
FIGS. 17a–c are timing charts indicating the relation of the camshaft drive torque and the angular velocity fluctuation in the second embodiment.

As shown in FIG. 17, if the pulse inductors are installed under the conditions, the integral value (size of area shown with shading lines in (b) of FIG. 17) of the angular velocity $\omega$ applied on phase differences DT1' to DT3' detected in the same manner will not be constant, but the same detected phase differences DT1' to DT3' will be all equal.

Thus, in the first control portion 110' illustrated in FIG. 15, even if the compensation value computation and map control portion or compensation value map explained earlier are not used, a highly reliable detected relative angle of rotation T1 and control amount D1 can be obtained based on these phase differences DT1' to DT3'.

Figure 18:
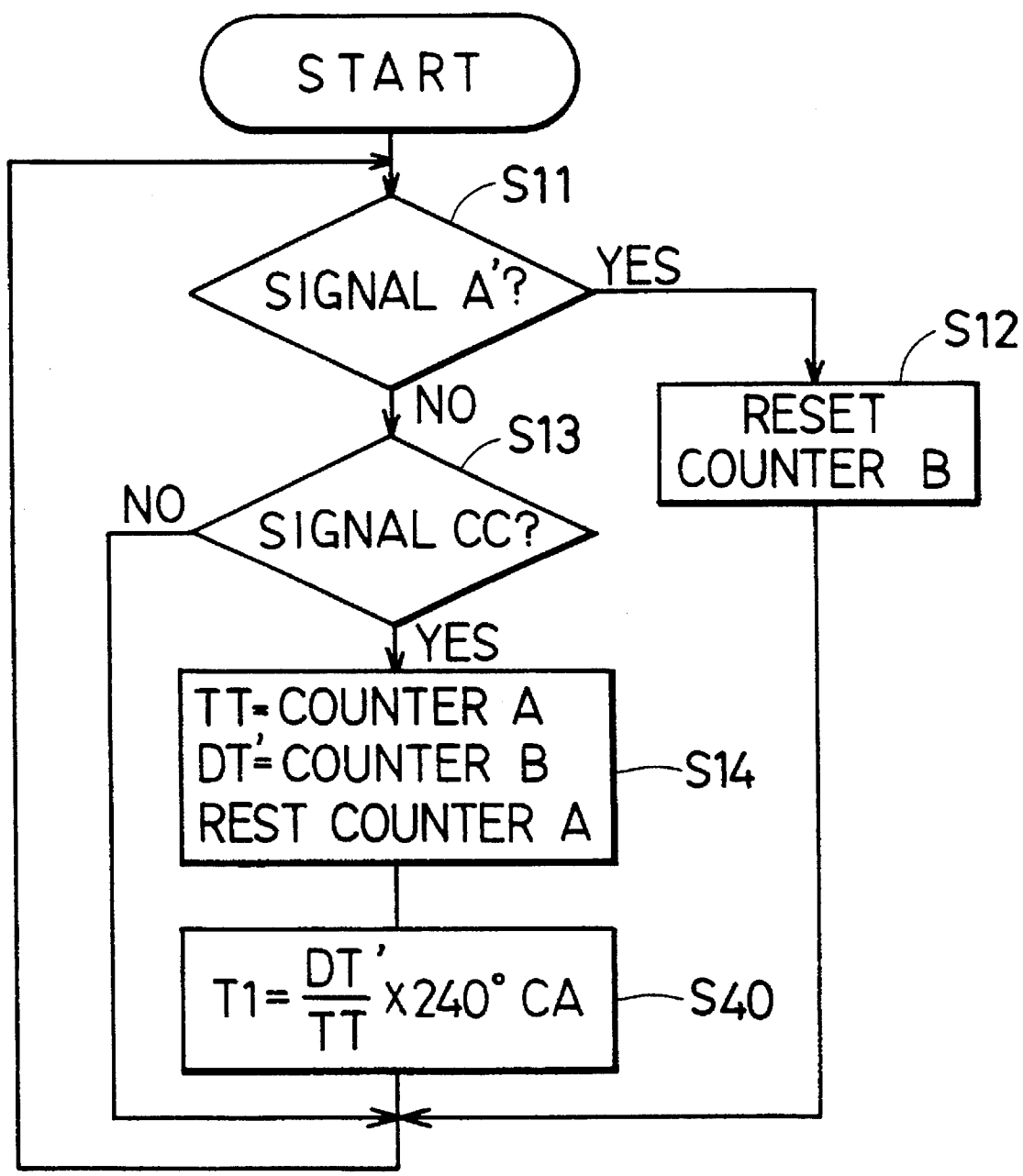
FIG. 18 is a timing chart indicating the phase difference detection procedure of the cam signal and reference angle signal by the device of the second embodiment.

FIG. 18 shows the detection procedure of the phase differences DT1' to DT3' and reference angle signal cycle TT executed by the first control portion 110' configured of phase difference detection portion 111 and relative rotation computation portion 114 and the computation procedure of the detection phase relative angle of rotation T1.

In other words, the phase detection portion 111 has two counters built-in. One is the counter A for measuring the reference angle signal cycle TT, and the counter B for measuring the phase difference DT'. Each time the cam signal A' or reference angle signal CC is input, the phase difference detection portion 111, executes the detection of the cycle TT and phase difference DT' with the procedure shown in FIG. 18.

For example, assume that cam signal A' has been input (step S11). At the phase difference detection portion 111, the counter B is reset (step S12), and the input of reference angle signal CC is waited for. When reset, the count value of the counter B is cleared to "0", and new counting starts at that point.

When the reference angle signal CC is input (step S13), the following process is done by said phase difference detection portion 111:

(1) The count value of the counter A is output as the detection value of cycle TT of the reference angle signal C; and (2) The count value of the counter B is output as the phase difference DT' of the cam signal A' and the reference angle signal CC.

At the same time, the counter A is reset (step S14). When reset, the count value of the counter A is cleared to "0", and new counting starts at that point.

On the other hand, at the relative rotation computation portion 114, the following computation is executed based on the detected reference angle signal CC cycle TT, and the phase difference DT' of cam signal A' and the reference angle signal CC to obtain the detection relative angle of rotation T1 (step S40).

$$T1=(DT'/TT)\times 240° \text{ CA}$$

The detected relative angle of rotation T1 calculated in this manner is sent to the control amount computation portion 116, and after that is supplied to the phase amount adjustment control or valve opening/closing timing feedback control by rotational phase difference mechanism 7 (7A) in the same format as the device in the first embodiment.

Thus, the variation in each phase difference of the cam signal to the reference angle signal CC is effectively suppressed even in the second embodiment. Thus, the opening/closing timing of the intake valve is controlled to the appropriate favorable control by the feedback control and the hunting mentioned earlier is also suppressed even with the device according to the second embodiment.

By combining the device according to the second embodiment with the device according to the first embodiment, a device with a highly reliable feedback control can be realized. In other words, if the installation of each pulse inductor to the camshaft 5 (5A, 5B) is deviated in the method shown in FIG. 16, for example, the variation of the phase difference DT' in the cam signal (A', B') and the reference angle signal CC output based on this can be suppressed accurately. However, the variation of the corresponding phase difference DT' does not always occur in a constant form under all internal combustion engine operation conditions, and it is especially anticipated that the occurrence of the inconsistency will differ when the engine speed is high and low.

Thus, when the device according to the second embodiment is combined with the device according to the first embodiment, and the first and second control portions 110 and 120 illustrated in FIG. 1 having the compensation value computation and map control portion 112 and the compensation value map 113 are used for the first and second control portions, these types of problems can be favorably resolved. In each of the embodiments, a device in which three pulse inductors are installed on each of the two camshafts for the intake valves on the V-type 8-cylinder internal combustion engine, and the phase difference detection and the feedback control are done three times per camshaft rotation was explained. However, the application of these devices may be made to any internal combustion engines and the number of installed pulse inductors, etc., may be determined as wanted.

The number of these pulse inductors is set according to the phase adjustment range of the rotational phase adjustment mechanism being used for the device, the required control precision and the required response, etc. By installing at least two pulse inductors per camshaft, feedback control with a sufficiently practical cycle and precision can be realized.

The internal combustion engine equipped with the valve timing control device is not limited to the V-type 8-cylinder engine explained earlier. This valve timing control device can be applied in the same manner as the embodiment if the engine is a V-type multiple cylinder internal combustion engine or inline multiple cylinder internal combustion engine.

The camshaft that is controlled by the rotational phase adjustment mechanism or pulse inductor installation is also not limited to the camshaft for the intake valve. The rotational phase adjustment mechanism and the pulse indicators can be installed in the same manner on the camshaft for the exhaust valve.

Furthermore, selection of the rotational phase adjustment mechanism is not limited to that with the configuration illustrated in FIG. 2. If the mechanism can adjust the relative rotational phase of the crankshaft (conveyance mechanism) and camshaft, it can be used for the rotational phase adjustment mechanism of the valve timing control device.

In the above embodiments, the phase difference was detected as the occurrence timing of each pulse configuring the reference angle signal to the occurrence timing configuring the cam signal, but this pulse relation can be reversed. In other words, the corresponding phase difference can be detected as the occurrence timing of each pulse configuring the cam signal to the occurrence timing of each pulse configuring the reference angle signal.

In the above embodiments, the corresponding control amount D1 (or D2) was computed each time the detected relative angle of rotation T1 (or T2) was computed. However, this can be changed to obtaining the control amount D1 (or D2) from the average value obtained as a result of computing multiple detected relative angles of rotation T1 (or T2). With this type of configuration, the number of control times can be reduced with the rotational phase adjustment mechanism, and the precision and reliability of the detected relative angle of rotation T1 (or T2) can be further improved.

Furthermore, when obtaining the target relative angle of rotation TG for computing the control amount D1 (or D2) in the embodiments, the intake amount Q was incorporated as information to indicate the load of the corresponding internal combustion engine. However, information indicating the throttle opening can also be used as information to indicate the load.

The compensated variation in phase difference in any of the embodiments should be suppressed to ±5° CA, favorably ±3° CA and more favorably to ±2° CA or less in terms of the performance as an internal combustion engine, in terms of cleaning the exhaust gas and in terms of the stability of the control device itself.

As explained above, with this invention, multiple signal induction means are installed at arbitrary angle intervals to the camshaft, and the variation in the cam signals and reference angle signals generated in correspondence to the installation position of the induction means are electrically compensated. The compensated phase difference is monitored, and the valve timing is feedback controlled. Thus, no matter how the camshaft angular velocity or drive torque fluctuates, the relative angle of rotation of the crankshaft and camshaft can be swiftly and accurately detected, and the valve timing can be feedback controlled with a high reliability in any type of internal combustion engine.

Furthermore, according to this invention, by installing multiple signal induction means under position conditions deviated by the angle that can absorb the camshaft angular velocity fluctuation between the position from the position corresponding angle-wise to each reference angle signal, the variation in the phase difference between the cam signal and the reference angle signal corresponding to the installation position of the induction means can be compensated. The compensated phase difference is monitored, and the valve timing is feedback controlled. Due to this, the relative angle of rotation of the crankshaft and the camshaft can be swiftly and accurately detected. Thus, the valve timing can be feedback controlled with a high reliability in any type of internal combustion engines.

What is claimed is:

1. A valve timing control device for an internal combustion engine, comprising:

conveyance means to convey rotation of a crankshaft to a camshaft on which multiple cams are mounted to open and close at least one of multiple intake valves and exhaust valves in the engine; rotational phase adjustment means to adjust a rotational phase between the crankshaft and the camshaft intervened by the conveyance means;

a crank angle sensor installed on the crankshaft for producing a crankshaft signal indicative of a rotational position of the crankshaft;

reference angle signal generation means to generate at least two reference angle signals based on said crankshaft signal output by the crank angle sensor;

a plurality of signal induction means installed at a predetermined angular interval on the camshaft;

a cam angle sensor that in cooperation with the signal induction means outputs a plurality of cam signals each time the crankshaft makes one rotation;

phase difference compensation means that electrically compensates variations in an angular phase differences between the cam signals and the reference angle signals occurring in dependence on a rotational speed of the cam shaft, said phase difference compensation means producing compensated cam signals; and phase control means that monitors phase differences between the compensated cam signals and the reference angle signals, and which determines an adjustment amount with said rotational phase adjustment means so that the phase differences are made equal to target values.

2. The valve timing control device according to claim 1, wherein the phase difference compensation means has:

first computation means to compute compensation values for the phase differences using at least one of the phase differences between the cam signal and said reference angle signal; and second computation means to compensate the phase differences between the cam signals and the reference angle signals using the computed compensation values.

3. The valve timing control device according to claim 1, wherein the phase difference compensation means has:

compensation value computation means that computes difference amount values under various operation conditions of the engine using one of the compensation values for the phase differences between the cam signals and the reference angle signal as a reference;

compensation value memory in which the computed compensation values are stored as a data map in correspondence to parameters that indicate the operation conditions of the engine; and compensation means which reads the compensation values from the compensation value memory according to each operation condition of the engine for the phase differences other than the one of the phase differences between the cam signals and the reference angle signals not used as the reference.

4. A valve timing control device for an internal combustion engine, comprising:

conveyance means to convey rotation of a crankshaft to a camshaft on which multiple cams are installed to open and close at least one of multiple intake valves and exhaust valves in an engine;

rotational phase adjustment means to adjust a rotational phase between the crankshaft and the camshaft intervened by the conveyance means;

a crank angle sensor installed on the crankshaft for producing a crankshaft signal indicative of a rotational position of the crankshaft;

reference angle signal generation means to generate at least two reference angle signals based on said crankshaft signal output by the crank angle sensor, a plurality of signal induction means installed, relative to the camshaft, under installation conditions in which the position of the signal induction means is deviated by an angle from the position of the reference angle signal generation means, so that camshaft angular velocity fluctuations can be absorbed at said position of the signal induction means;

a cam angle sensor that in cooperation with the signal indication means outputs a plurality of cam signals each time the camshaft makes one rotation, and phase control means that monitors phase differences between the cam signals and the reference angle signals, and which determines an adjustment amount with the rotational phase adjustment means so that the phase differences become equal to target values.

5. The valve timing control device according to claim 4, wherein the engine is a V-type engine having two cylinder banks forming V-shape centered on the crankshaft, and one of the camshafts for at least one of the intake valves and the exhaust valves is installed for each bank, and the plurality of signal induction means are installed at uneven angular intervals such that angular velocity fluctuation induced in the rotational motion of the cams due to the cams lacking an angle-wise cycle when viewed in an axial direction can be absorbed.

6. A valve timing control device for an internal combustion engine, comprising:

conveyance means to convey rotation of a crankshaft to a camshaft on which multiple cams are mounted to open and close at least one of multiple intake valves and exhaust valves in an engine;

rotational phase adjustment means to adjust a rotational phase between the crankshaft and the camshaft intervened by the conveyance means;

a crank angle sensor installed on the crankshaft for producing a crankshaft signal indicative of a rotational position of the crankshaft, reference angle signal generation means to generate at least two reference angle signals based on said crankshaft signal output by the crank angle sensor;

a plurality of signal induction means installed on the camshaft under installation conditions in which the position of the signal induction means is deviated by an angle at which the camshaft angular velocity fluctuation can be absorbed and deviated by an angle from the position corresponding to the reference angle signal generation means;

a cam angle sensor that in cooperation with the signal induction means outputs a plurality of cam signals each time the camshaft makes one rotation;

phase difference compensation means that electrically compensates variations in the phase between the cam signals and the reference angle signals which occur due to the installation positions of the signal induction means; and phase control means that monitors the compensated phase differences between the cam signals and the reference angle signals, and which determines adjustment amounts with the rotation phase adjustment means so that the phase differences become equal to target values.

7. The valve timing control device according to claim 1, wherein said phase difference compensation means has:

storage means for storing compensation values in relation to operating conditions of the engine, said compensation values being used to compensate the variations in the phase differences for the respective cam signals; and computing means for reading out the compensation values from said storage means in correspondence to the operating conditions and compensating the phase differences using the compensation values.

8. The valve timing control device according to claim 7, wherein said phase difference compensation means further has:

correction value computing means for computing correction values for correcting the compensation values; and renewing means for renewing the compensation values in said storage means by the corrected compensation values.

9. The valve timing control device according to claim 2, wherein said first computation means computes the compensation values as at least one of a difference and a ratio relative to one of the phase differences selected as a reference, and said second computation means compensates the phase differences other than that used as the reference by at least one of addition of the difference and multiplication of the ratio.

10. The valve timing control device according to claim 2, wherein said phase difference compensation means has storage means for storing the compensation values in relation to the operating conditions of the engine as a parameter, and said second computation means reads out the stored compensation values from said storage means in correspondence to the operating conditions to compensate the phase differences.

* * * * *